United States Patent
Jaradi et al.

(10) Patent No.: US 10,703,329 B2
(45) Date of Patent: Jul. 7, 2020

(54) SEATBELT ASSEMBLY INCLUDING A TWO-POINT SEATBELT

(71) Applicant: Ford Global Technologies, LLC, Dearborn, MI (US)

(72) Inventors: Dean M. Jaradi, Macomb, MI (US); Mohammed Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 391 days.

(21) Appl. No.: 15/438,048

(22) Filed: Feb. 21, 2017

(65) Prior Publication Data
US 2018/0236967 A1    Aug. 23, 2018

(51) Int. Cl.
| | |
|---|---|
| *B60N 2/02* | (2006.01) |
| *B60R 22/24* | (2006.01) |
| *B60R 22/26* | (2006.01) |
| *B60R 22/34* | (2006.01) |
| *B60N 2/809* | (2018.01) |
| *B60N 2/68* | (2006.01) |
| *B60R 22/02* | (2006.01) |
| *B60R 22/18* | (2006.01) |
| *B60N 2/80* | (2018.01) |

(52) U.S. Cl.
CPC ............. *B60R 22/26* (2013.01); *B60N 2/688* (2013.01); *B60N 2/809* (2018.02); *B60R 22/023* (2013.01); *B60N 2002/899* (2018.02); *B60R 2022/027* (2013.01); *B60R 2022/1818* (2013.01)

(58) Field of Classification Search
CPC .... B60N 2/0244; B60N 2/4808; B60N 2/809; B60N 2002/899; B60R 22/24; B60R 22/26; B60R 22/34; B60R 2022/1818
See application file for complete search history.

(56) References Cited

U.S. PATENT DOCUMENTS

| | | | |
|---|---|---|---|
| 3,912,329 A | 10/1975 | Connors et al. | |
| 5,390,982 A | 2/1995 | Johnson et al. | |
| 6,139,111 A * | 10/2000 | Pywell ................ | B60N 2/0705 297/484 |
| 6,305,713 B1 * | 10/2001 | Pywell ................ | B60N 2/2222 280/801.1 |
| 6,666,519 B2 * | 12/2003 | Palliser ............... | B60R 22/023 297/481 |

(Continued)

FOREIGN PATENT DOCUMENTS

| | | |
|---|---|---|
| GB | 2378681 A | 2/2003 |
| WO | WO 2005118330 A2 | 12/2005 |

OTHER PUBLICATIONS

GB Search Report dated Aug. 16, 2018 re GB Appl. No. 1802712.8.

*Primary Examiner* — Jerrah Edwards
(74) *Attorney, Agent, or Firm* — Frankie A. MacKenzie; Bejin Bieneman PLC (57) ABSTRACT

A seat assembly for a vehicle includes a seat, and a first seatbelt having a first end and a second end. The first end of the first seatbelt is coupled to the seat. The seat assembly includes a latch plate and a second seatbelt. The latch plate is fixed to the second end of the first seatbelt, and the second seatbelt is slideably coupled to the latch plate. The first seatbelt and the second seatbelt increase lateral support of the occupant during, e.g., a rollover event, oblique or side impacts.

11 Claims, 8 Drawing Sheets

(56) References Cited

U.S. PATENT DOCUMENTS

| | | | |
|---|---|---|---|
| 6,786,510 B2 | 9/2004 | Roychoudhury et al. | |
| 6,871,876 B2 * | 3/2005 | Xu | A44B 11/2549 |
| | | | 280/801.1 |
| 8,894,142 B2 * | 11/2014 | Alexander | B60N 2/876 |
| | | | 297/216.12 |
| 9,308,890 B2 * | 4/2016 | Rouhana | B60R 22/347 |
| 2002/0153760 A1 * | 10/2002 | Palliser | B60R 22/023 |
| | | | 297/472 |
| 2003/0034686 A1 | 2/2003 | Soderstrom et al. | |
| 2004/0012242 A1 | 1/2004 | White | |
| 2004/0155451 A1 * | 8/2004 | Xu | A44B 11/2549 |
| | | | 280/808 |
| 2012/0001461 A1 * | 1/2012 | Alexander | B60N 2/876 |
| | | | 297/216.12 |
| 2014/0138942 A1 * | 5/2014 | Rouhana | B60R 22/347 |
| | | | 280/807 |
| 2016/0339869 A1 | 11/2016 | Schmidt et al. | |

* cited by examiner

SEATBELT ASSEMBLY INCLUDING A TWO-POINT SEATBELT

BACKGROUND

Automobiles are subject to a variety of crash tests, including standard tests regulated by the National Highway Traffic Safety Administration (NHTSA). For example, these tests may be directed toward full frontal impacts, oblique impacts, i.e., impacts that occur at an angle of 10-50 degrees relative to a vehicle's trajectory, side impacts, and rollovers. During these impact events, occupants may move forward and laterally engaging with one or more restraint systems, e.g., seatbelts and airbags, etc.

A seatbelt assembly in a vehicle may include at least one belt, at least one retractor, and at least one buckle. The buckle and the retractor are mounted to the vehicle, e.g., a seat or a body of the vehicle. The belt is retractably extendable from the retractor, and the belt is releasably engageable with the buckle, e.g., with a latch plate slidably engaged with the belt. One type of seatbelt assembly is a three-point seatbelt assembly, in which the belt engages the seat/body of the vehicle at three points, e.g., the retractor, the buckle, and a fixed connection point. In this instance, the belt may extend from a first end in the retractor to a second end fixed to the fixed connection point, and the latch plate may be connected to the buckle to create a third point of attachment to the vehicle. There remains an opportunity to design a restraint system that reduces lateral movement during a variety of impact scenarios.

DETAILED DESCRIPTION

With reference to the Figures, wherein like numerals indicate like parts throughout the several views, a seat assembly 10 for a vehicle 12 includes a seat 14 and a first seatbelt 16. The first seatbelt 16 has a first end 18 and a second end 20. The first end 18 of the first seatbelt 16 is coupled to the seat 14. The seat assembly 10 includes a latch plate 22 and a second seatbelt 24. With reference to FIGS. 1-3 and 6, the latch plate 22 is fixed to the second end 20 of the first seatbelt 16, and the second seatbelt 24 is slideably coupled to the latch plate 22. The latch plate 22 defines a slot 82, and the second seatbelt 24 extends through and is slidable relative to the slot 82. The latch plate 22 defines a second slot 84, and the second end 20 of the first seatbelt 16 is fixed to the second slot 84. The seat assembly 10 may include a retractor 72 mounted to the seat 14, and the first end 18 of the first seatbelt 16 is retractably engaged with the retractor 72 at the first end 18 of the first seatbelt 16. The seat assembly 10 includes a second retractor 74, and the second seatbelt 24 is retractably engaged with the second retractor 74. The seat 14 includes a seat back 38 and a head restraint 46 supported by the seat back 38. The head restraint 46 defines a guide passage 58, and the first seatbelt 16 extends through the guide passage 58. The seat assembly 10 may include the retractor 72 mounted to the seat back 38. The first end 18 of the first seatbelt 16 is retractably engaged with the retractor 72 at the first end 18 of the first seatbelt 16, and the first seatbelt 16 extends from the retractor 72 through the guide passage 58 to the latch plate 22. The head restraint 46 has a perimeter 66 and defines a slit 64, and the slit 64 extends from the perimeter 66 to the guide passage 58. The head restraint 46 includes a cap 68 that extends across the slit 64. The seat assembly 10 may include a buckle 56 that is releasably engageable with the latch plate 22, a motor 54 coupled to the head restraint 46, and a computer 100. The computer 100 may be programmed to receive an unlatched signal indicating that the latch plate 22 is disengaged with the buckle 56, and as a result of receiving the unlatched signal, command the motor 54 to move the head restraint 46 away from the seat back 38. The computer 100 may be further programmed to receive a latched signal indicating that the latch plate 22 is engaged with the buckle 56, and as a result of receiving the latched signal, command the motor 54 to move the head restraint 46 toward the seat back 38. The seat assembly 10 may include the buckle 56 fixed to the seat 14 and releasably engageable with the latch plate 22.

A seatbelt assembly 70 includes the retractor 72 and the first seatbelt 16. The first seatbelt 16 is retractably engaged with the retractor 72 and extends from the retractor 72 to the end 20 of the first seatbelt 16. The seatbelt assembly 70 includes the latch plate 22 and the second seatbelt 24. The latch plate 22 is fixed to the end 20 of the first seatbelt 16, and the second seatbelt 24 is slideably coupled to the latch plate 22. The seatbelt assembly 70 includes the second retractor 74, and the second seatbelt 24 is retractably engaged with the second retractor 74. The latch plate 22 defines the slot 82, and the second seatbelt 24 extends through and is slidable relative to the slot 82. The latch plate 22 defines the second slot 84, and the end 20 of the first seatbelt 16 is fixed to the second slot 84.

A vehicle system 92 may include the computer 100 programmed to receive at least one of an open signal indicating that a vehicle door 96 is opened, an OFF signal indicating that a vehicle ignition switch 94 is de-energized, and the unlatched signal indicating that the latch plate 22 is disengaged with the buckle 56, and as a result of receiving the at least one of the open signal, the OFF signal, and the unlatched signal, command the motor 54 to move the head restraint 46 away from the seat back 38. The computer 100 may be further programmed to receive at least one of an ON signal indicating that the vehicle ignition switch 94 is energized, and the latched signal indicating that the latch plate 22 is engaged with the buckle 56, and as a result of receiving the at least one of the ON signal, and the latch signal, command the motor 54 to move the head restraint 46 toward the seat back 38.

Figure 1:
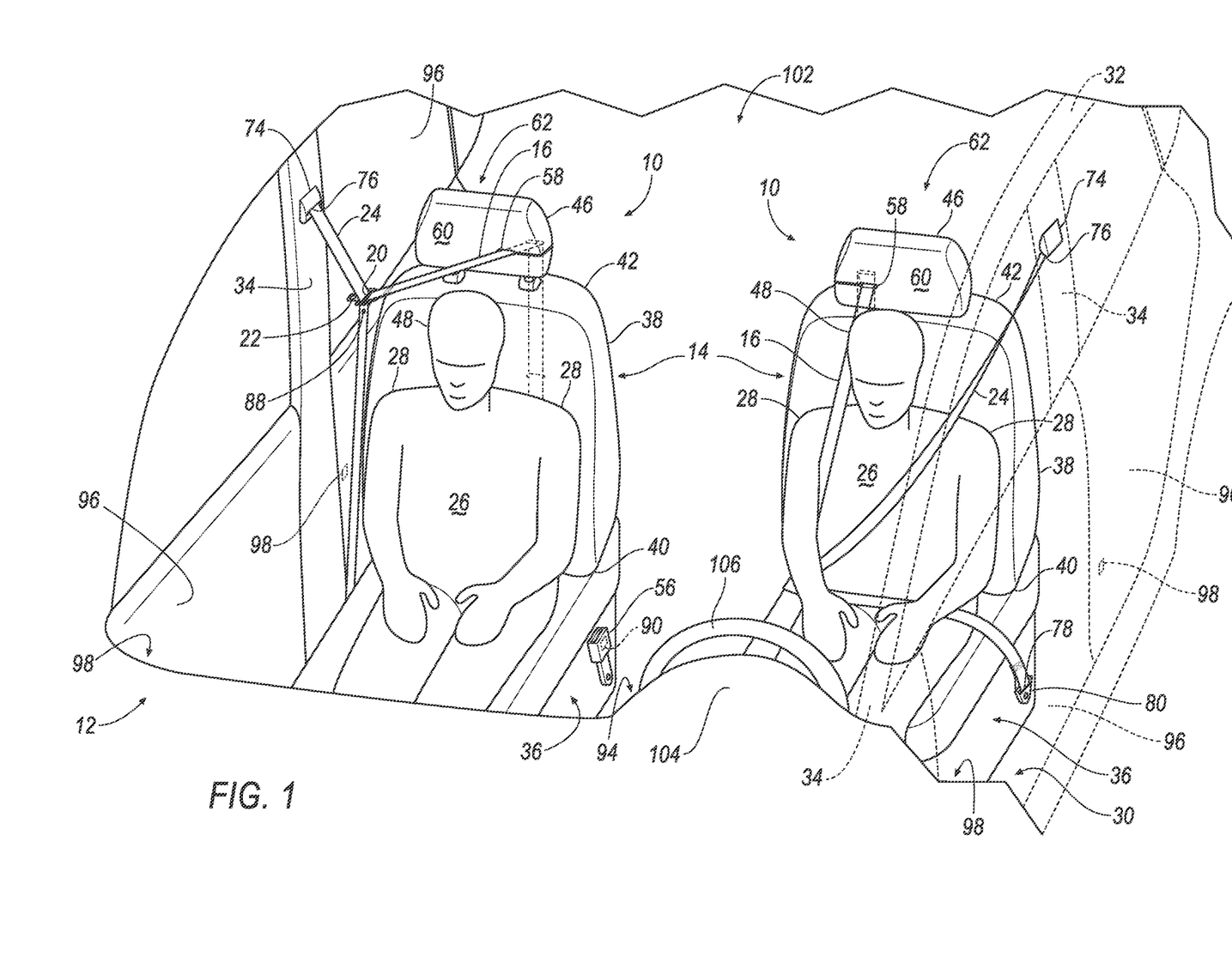
FIG. 1 is a perspective view of a portion of a vehicle including two seat assemblies having a seatbelt assembly.
Figure 3:
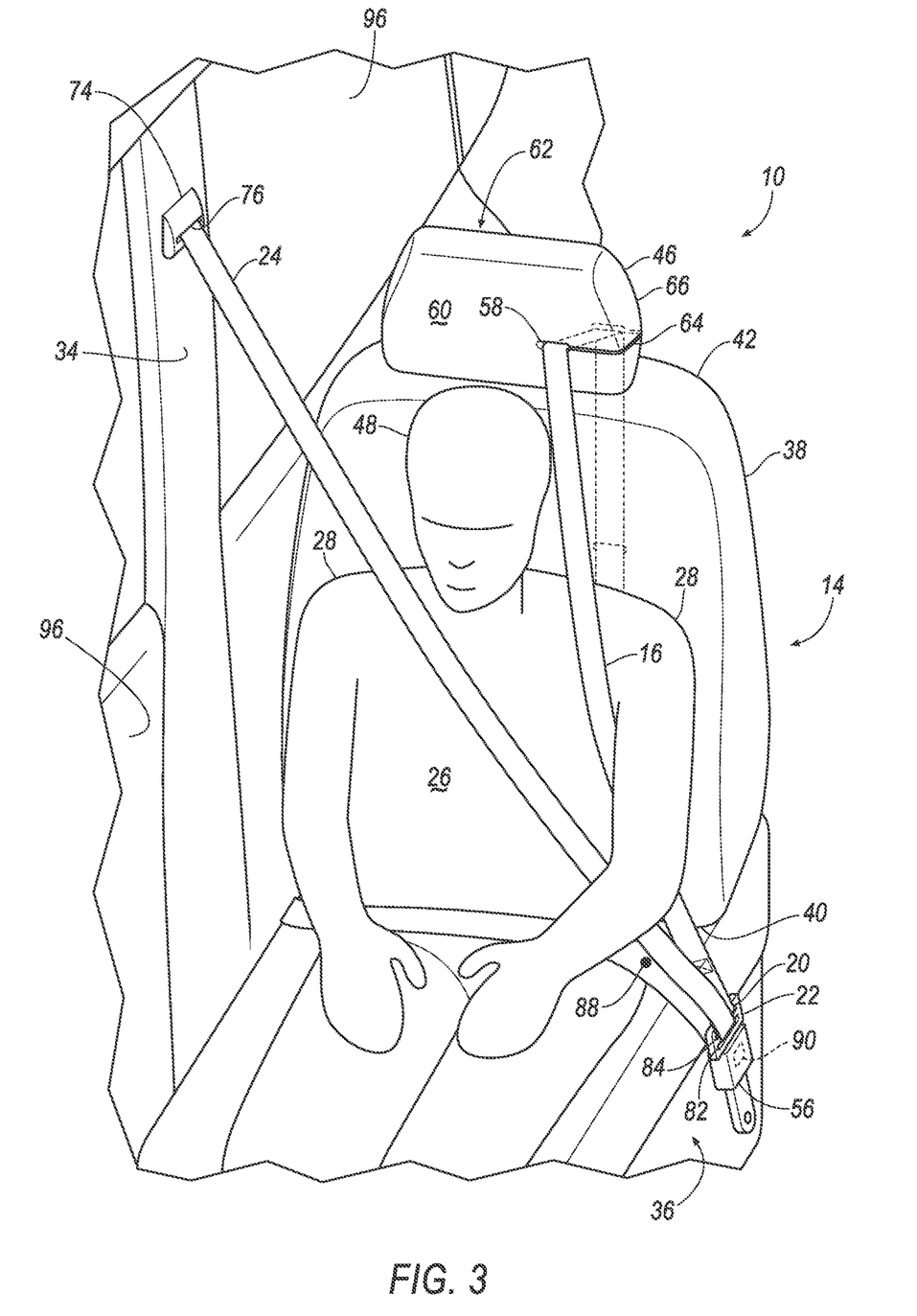
FIG. 3 is a perspective view of the seat assembly in a buckled position.

When an occupant 26 is seated on the seat 14, the first seatbelt 16 and the second seatbelt 24 may be positioned across the occupant 26 with the first seatbelt 16 across one shoulder 28 of the occupant 26 and the second seatbelt 24 extends across the other shoulder 28, as shown in FIGS. 1 and 3. During an impact of the vehicle 12 that urges the occupant 26 to move laterally, i.e., in a cross-vehicle direction, the first seatbelt 16 and the second seatbelt 24 resist lateral movement of the occupant 26. Impacts, for example, that may urge the occupant 26 to move laterally may include frontal offset impacts, oblique impacts, etc. Since the latch plate 22 is fixed to the second end 20 of the first seatbelt 16 and slideably coupled to the second seatbelt 24, the occupant 26 may move both the first seatbelt 16 and the second seatbelt 24 across the occupant 26 by grasping the latch plate 22 and pulling both the first seatbelt 16 and the second seatbelt 24 across the shoulders 28 of the occupant 26. In other words, the latch plate 22 provides a single grasping point to move both the first seatbelt 16 and the second seatbelt 24 across the shoulders 28 of the occupant 26.

With reference to FIG. 1, the vehicle 12 may include more than one seat assembly 10. For example, the vehicle 12 shown in FIG. 1 includes two seat assemblies 10. Each of these seat assemblies 10 may be identical, or mirror images of each other. Common numerals are used to identify common features in the two seat assemblies 10 in FIG. 1. The seat assemblies 10 may be located at any suitable position in the vehicle 12. The vehicle 12 may be any passenger or commercial vehicle including car, truck, sport utility vehicle, crossover vehicle, or the like.

With reference to FIG. 1, the vehicle 12 includes a floor 30. The seat assemblies 10 may be supported on the floor 30. The seat assemblies 10 may be secured to the floor 30 in any suitable manner.

Figure 2:
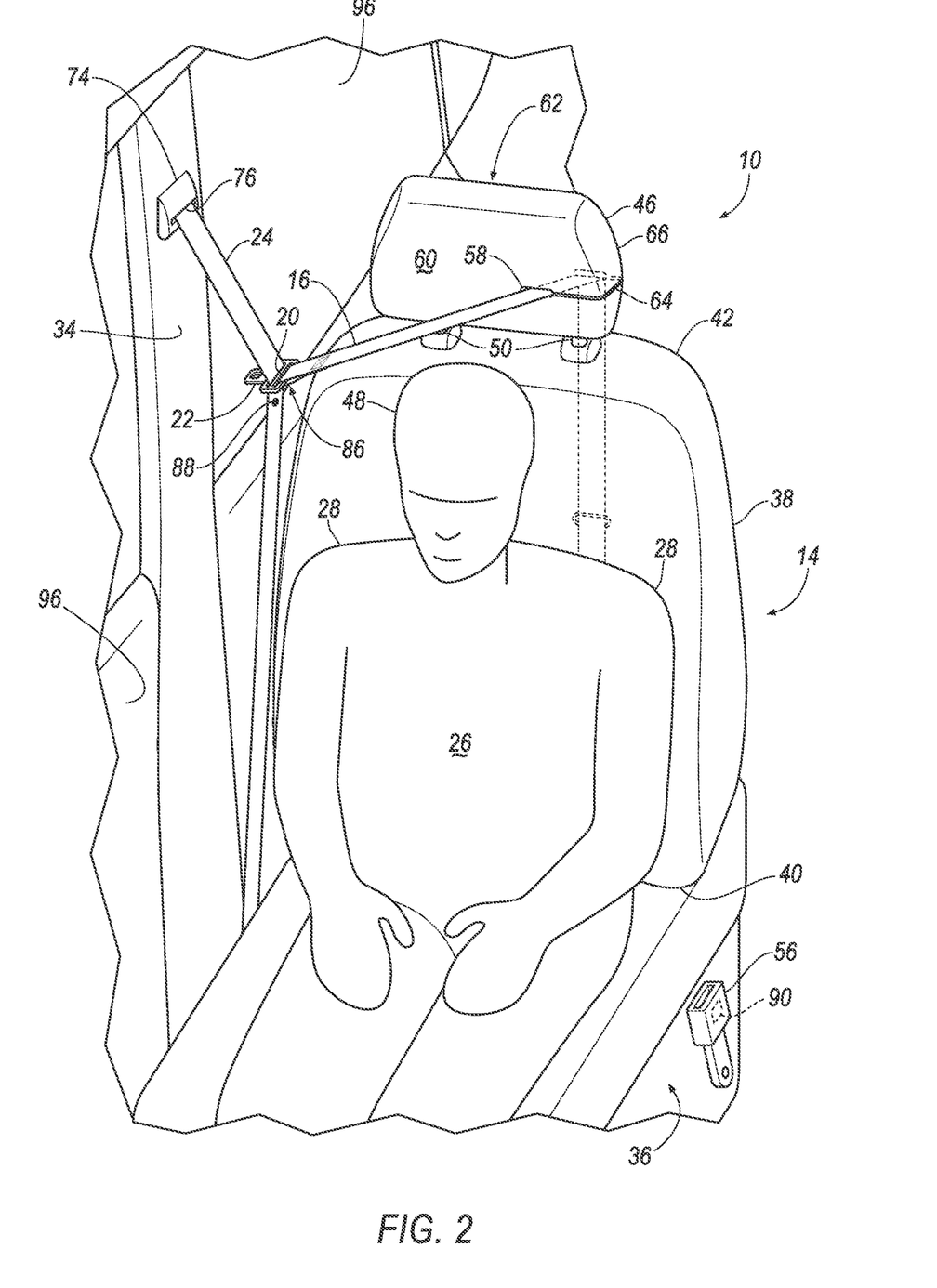
FIG. 2 is a perspective view of the seat assembly in an unbuckled position.

With continued reference to FIG. 1, the vehicle 12 includes side rails 32 and pillars 34. The pillars 34 extend from the side rails 32 in a downwardly direction. The second seatbelts 24 may be supported by the pillars 34. For example, as shown in FIGS. 1-3, the second seatbelts 24 of the seat assemblies 10 are coupled to the pillars 34, e.g., B-pillars, of the vehicle 12.

With reference to FIGS. 1-4, the seat 14 includes a seat bottom 36, and a seat back 38. The seat bottom 36 supports the seat back 38, and the seat bottom 36 is designed to connect to the floor 30 of the vehicle 12. For example, the seat bottom 36 may be slideably coupled to a support member (not shown) that is fixed to the floor 30. As another example, the seat bottom 36 may be fixed to the support member and the support member is slideably coupled to the floor 30. The seat back 38 may be rotatable, i.e., reclinable, relative to the seat bottom 36.

Figure 4:
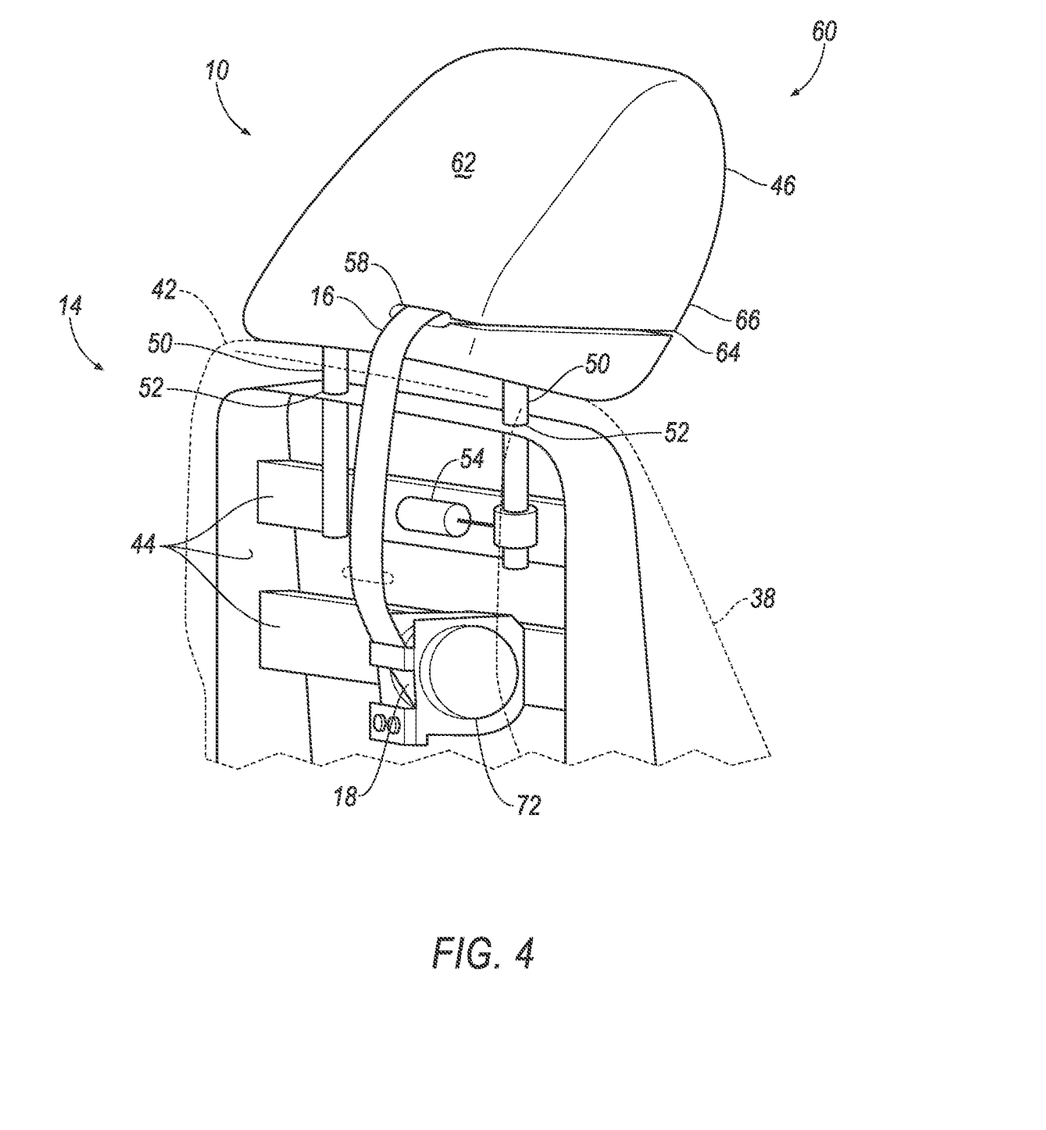
FIG. 4 is a perspective view of a portion of the seat assembly including a retractor and a motor mounted to the seat assembly.

The seat back 38 may have a first end 40 adjacent to the seat bottom 36, and a second end 42 spaced from the first end 40 and may be elongated from the first end 40 to the second end 42. As shown in FIG. 4, the seat back 38 may include a frame 44 and may include upholstery, foam, fabric, etc. supported on the frame 44. The frame 44 may be formed from metal, plastic, fiber-reinforced composite materials, etc.

The seat 14 includes the head restraint 46. The head restraint 46 is supported by the seat back 38. Specifically, the head restraint 46 may be coupled to the second end 42 of the seat back 38. The head restraint 46 is adjustable relative to the seat back 38, i.e., adjustable along a longitudinal axis of the seat back 38, between a raised position, as shown in FIG. 2, and a lowered position, as shown in FIG. 3. With reference to FIGS. 1-3, the head restraint 46 may be raised or lowered to accommodate a head 48 of the occupant 26. As disclosed further below, the head restraint 46 may be automatically moved between the lowered position to the raised position depending on events associated with the interaction between the occupant 26 and the vehicle 12, or the occupant 26 and the seat assembly 10.

One of the head restraint 46 and the seat back 38 may include at least one rod 50, and the other of the head restraint 46 and the seat back 38 may include at least one hole 52 adjustably receiving the rod 50 for movement of the head restraint 46 between the lowered position and the raised position. For example, as shown in FIG. 4, the seat back 38 may include two rods 50 and the seat back 38 may include two holes 52 adjustably receiving the rods 50. The rods 50 may be adjustable relative to the holes 52 in any suitable fashion.

The seat assembly 10 may include the motor 54 coupled to the head restraint 46. The motor 54 may engage with one or both of the rods 50 to adjust the rods 50 relative to the holes 52. As shown in FIG. 4, for example, the motor 54 is fixed to the frame 44 of the seat back 38 and is engaged with one rod 50. The motor 54 may be coupled to the rods 50 in any suitable configuration. The rods 50 may, for example, include teeth (not shown), and the motor 54 may be, e.g., a linear actuator, that includes a circular gear (not shown) that engages the teeth. The rotational motion applied to the circular gear from the motor 54 may cause the rod 50, i.e., the teeth, to move relative to the circular gear. The motor 54 may be configured to be connected to a source of electric current, e.g., a power source from the vehicle, to drive the circular gear. Alternatively, the motor 54 may be of any suitable type that may raise and lower the rod 50, for example, a stepper motor, a screw type linear actuator, etc., and the motor 54 may be attached to the seat 14 in any suitable manner.

As set forth below, the head restraint 46 may automatically move between the raised position and the lowered position depending upon particular events that occur, e.g., the occupant 26 disengaging the latch plate 22 from the buckle 56, the occupant 26 opening a door of the vehicle 12, etc. As further set forth below, the adjustability of the head restraint 46, and the associated movement of the first seatbelt 16 and the latch plate 22 may aid in occupant 26 ingress and egress to/from the vehicle 12, and/or assist in locating the latch plate 22 when the latch plate 22 is in the unbuckled position, as shown in FIG. 2.

With reference to FIGS. 1-5, the head restraint 46 defines the guide passage 58 that slideably receives the first seatbelt 16. The head restraint 46 has a front 60 and a back 62. Specifically, the front 60 faces a vehicle-forward direction, and the back 62 faces a vehicle-rearward direction. The guide passage 58 extends through the head restraint 46 from the front 60 to the back 62. In other words, the guide passage 58 extends in a vehicle fore-and-aft direction.

Figure 5:
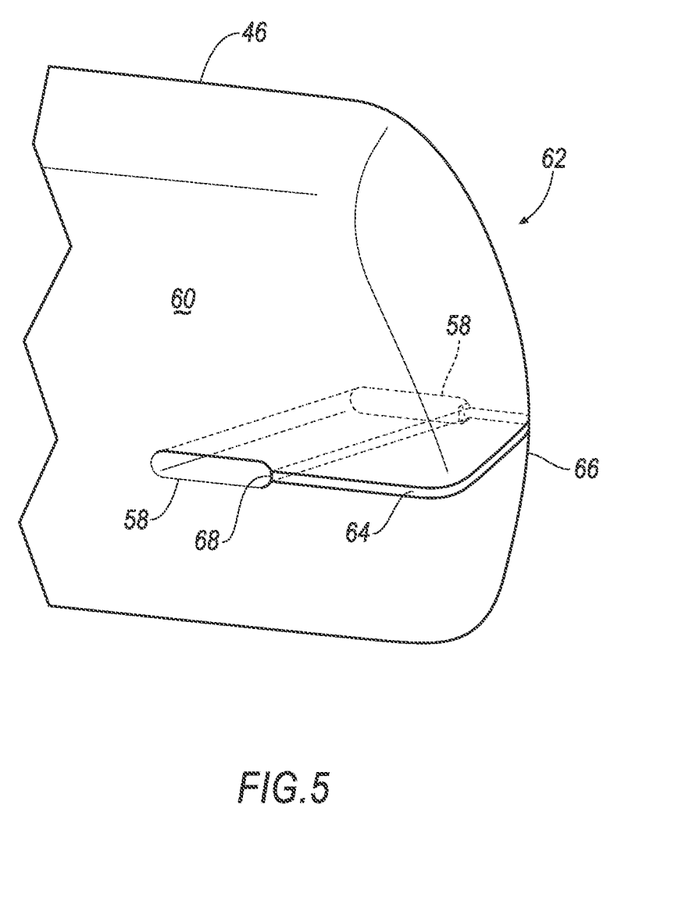
FIG. 5 is a perspective view of a portion of a head restraint.

With reference to FIGS. 4-5, the head restraint 46 may define the slit 64 providing access to the guide passage 58. Specifically, the head restraint 46 has the perimeter 66, and the slit 64 may extend from the perimeter 66 to the guide passage 58.

With reference to FIG. 5, the head restraint 46 may include the cap 68. The cap 68 may extend across the slit 64. Specifically, the cap 68 is fixed to the rest of the head restraint 46 in the slit 64. The cap 68 may be fixed to the rest of the head restraint 46 in any suitable fashion, e.g., adhesive, stitching, etc.

The first seatbelt 16 extends through the guide passage 58. Prior to fixing the cap 68 to the rest of the head restraint 46, the first seatbelt 16 is inserted through the slit 64 into the guide passage 58. The cap 68 may then be fixed to the rest of the head restraint 46 in the slit 64 to retain the first seatbelt 16 in the guide passage 58. As shown in FIGS. 1-4, the first seatbelt 16 extends from the first end 18 of the first seatbelt 16, through the guide passage 58 from the back 62 to the front 60, to the second end 20 of the first seatbelt 16. Specifically, the first seatbelt 16 extends from the seat back 38 through the guide passage to the latch plate 22.

Figure 6:
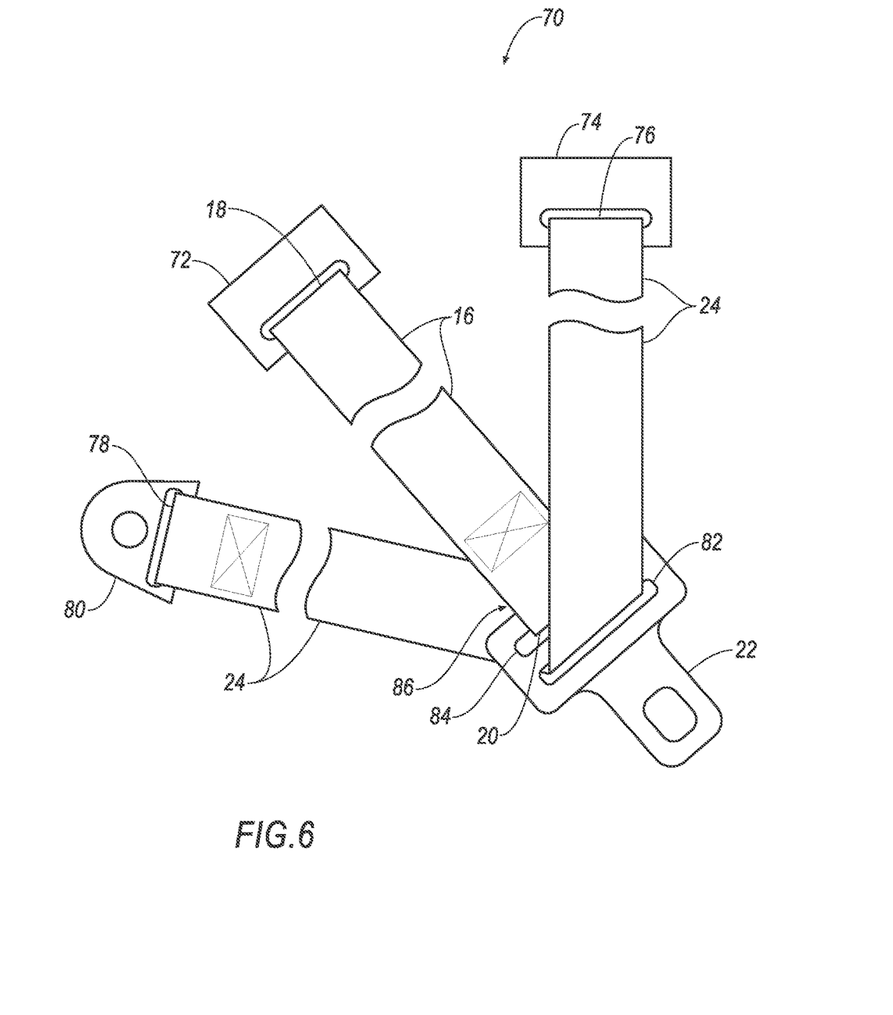
FIG. 6 is a top view of the seatbelt assembly.

As shown in FIG. 6, the seat assembly 10 includes the seatbelt assembly 70. The seatbelt assembly 70 includes the first seatbelt 16, the second seatbelt 24, and the latch plate 22. As set forth further below, the seatbelt assembly 70 includes the retractor 72, hereinafter referred to as the "first retractor 72," and the second retractor 74.

The first retractor 72 is mounted to the seat 14. For example, the first retractor 72 is mounted to the frame 44 of the seat back 38, as shown in FIG. 4. The first retractor 72 may be mounted to the seat back 38 by, e.g., fasteners, bolts, welding, etc.

The second retractor 74 may be mounted to a body (not numbered) of the vehicle 12. For example, as shown in FIGS. 1-3, the second retractor 74 may be mounted to a B-pillar. As other examples, the second retractor 74 may be mounted to any suitable component of the body, e.g., side rails 32, pillars 34, etc. The second retractor 74 may be mounted to the body by, e.g., fasteners, bolts, welding, etc.

With reference to FIGS. 4 and 6, the first end 18 of the first seatbelt 16 is coupled to the seat 14. Specifically, the first end 18 of the first seatbelt 16 is retractably engaged with the first retractor 72. The first seatbelt 16 extends from the first retractor 72 to the second end 20 of the first seatbelt 16. Specifically, as set forth above, the second end 20 of the first seatbelt 16 is fixed to the latch plate 22, and the first seatbelt 16 extends from the first retractor 72 to the latch plate 22.

With reference to FIGS. 1-3, and 6, the second seatbelt 24 includes a first end 76 and a second end 78. The first end 76 of the second seatbelt 24 is retractably engaged with the second retractor 74. The second end 78 of the second seatbelt 24 may be mounted to the body of the vehicle 12. For example, the seatbelt assembly 70 may include an anchor 80 mounted to the body of the vehicle 12, and the second end 78 of the second seatbelt 24 is fixed to the anchor 80.

The first seatbelt 16 extends continuously from the first end 18 to the second end 20 of the first seatbelt 16. The second seatbelt 24 extends continuously from the first end 76 to the second end 78 of the second seatbelt 24. In other words, the first seatbelt 16 is a one-piece unit from the first end 18 to the second end 20, and is not separable in a nondestructive manner between the first end 18 and the second end 20. Likewise, the second seatbelt 24 is a one-piece unit from the first end 76 to the second end 78, and is not separable in a nondestructive manner between the first end 76 and the second end 78. The first seatbelt 16 and the second seatbelt 24, for example, may be formed of a woven fabric, such as woven nylon. As one example, the first seatbelt 16 and the second seatbelt 24 are one-piece woven nylon extending from the first ends 18, 76 to the second ends 20, 78, respectively.

The first retractor 72 and the second retractor 74 may each have a locked state and an unlocked state. The first retractor 72 in the locked state locks the first seatbelt 16 to prevent the first seatbelt 16 from extending from the first retractor 72. Similarly, the second retractor 74 locks the second seatbelt 24 to prevent the second seatbelt 24 from extending from the second retractor 74. For example, the locked state of the first retractor 72 and the second retractor 74 may be triggered by a sudden decelerations of the vehicle.

In the unlocked state, the first seatbelt 16 and the second seatbelt 24 are selectively extendable from the first retractor 72 and the second retractor 74, respectively. For example, in the unlocked state, the occupant 26 may move the latch plate 22 from the unbuckled position to the buckled position by extending the first seatbelt 16 and the second seatbelt 24 from the first retractor 72 and the second retractor 74, respectively. For example, the first retractor 72 and the second retractor 74 may be in the unlocked state by default, i.e., in the absence of a sudden deceleration.

The first retractor 72 and the second retractor 74 may independently change between the locked state and the unlocked state. In other words, the first retractor 72 may change between the locked state and the unlocked state independently of the second retractor 74, and the second retractor 74 may change between the locked state and the unlocked state independently of the first retractor 72.

The first seatbelt 16 and the second seatbelt 24 may be operated differently from each other. For example, one or both of the first retractor 72 and the second retractor 74 may have a torsion bar (not shown) that allows additional extension of the first seatbelt 16/second seatbelt 24 from the respective first retractor 72 and second retractor 74. In the event both the first retractor 72 and the second retractor 74 have torsion bars, the torsion bars may be different or operate differently. As another example, one or both of the first seatbelt 16 and the second seatbelt 24 may be coupled to a pretensioner (not shown) that reduces slack in the first seatbelt 16/second seatbelt 24 prior to sudden deceleration of the vehicle 12. In the event both the first seatbelt 16 and the second seatbelt 24 are coupled to pretensioners, the pretensions may be different or operate differently.

As shown in FIGS. 1-3, and 6, the latch plate 22 defines the slot 82 and the second slot 84. The second seatbelt 24 extends through and is slidable relative to the slot 82. Accordingly, the latch plate 22 may slide along the second seatbelt 24 as the latch plate 22 is moved between the buckled position and the unbuckled position.

As set forth above, the second end 20 of the first seatbelt 16 is fixed to the second slot 84. The first seatbelt 16 may include a loop 86 fixed to the second slot 84. Specifically, the first seatbelt 16 may be folded against itself and stitched together at the second end 20. As other examples, the second end 20 of the first seatbelt 16 may be fixed to the second slot 84 in any suitable fashion, e.g., adhesion, fasteners, etc. The second end 20 of the first seatbelt 16 is permanently fixed to the second slot 84, i.e., is not removable from the second slot 84 without irreversibly destructing a portion of the first seatbelt 16 or latch plate 22.

With reference to FIGS. 1-3, the seat assembly 10 includes the buckle 56. The buckle 56 may be fixed to the seat 14. For example, the buckle 56 may be fixed directly to the seat bottom 36 of the seat 14, as shown in FIGS. 1-3. As another, example, the buckle 56 may be fixed to the body of the vehicle 12, e.g., the floor 30.

The buckle 56 may be releasably engageable with the latch plate 22, i.e., the latch plate 22 may be selectively engaged with and disengaged with the buckle 56. When the latch plate 22 is engaged with the buckle 56, the first and second seatbelts 16, 24 may form a four-point harness, meaning that the first and second seatbelts 16, 24 have four mounting points of contact with the seat assembly 10 and/or the vehicle 12. As shown in FIGS. 1-4, when the latch plate 22 is engaged with the buckle 56, the four mounting points of contact of the first and second seatbelts 16, 24 with the seat assembly 10/vehicle 12 may be: the first end 76 of the second seatbelt 24 to the vehicle 12 via the second retractor 74; the second end 78 of the second seatbelt 24 to the seat 14 via the anchor 80; the first end 18 of the first seatbelt 16 to the frame 44 of the seat back 38 via the first retractor 72;

and the first and second seatbelts 16, 24 coupled to the latch plate 22 and the latch plate 22 engaged with the buckle 56.

As shown in FIGS. 1-4, the guide passage 58 of the head restraint 46 supports the first seatbelt 16. Accordingly, when the head restraint 46 is adjusted relative to the seat back 38, as described above, the head restraint 46 adjusts the first seatbelt 16 and the latch plate 22 relative to the seat back 38. In other words, when the head restraint 46 is in the raised position and the latch plate 22 is in the unbuckled position, the first seatbelt 16 may be more above than behind the occupant 26, which may aid in locating the first seatbelt 16 and the latch plate 22, e.g., when the occupant 26 reaches behind herself to grasp the latch plate 22. Additionally or alternatively, with the head restraint 46 in the raised position and the latch plate 22 in the unbuckled position, the first seatbelt 16, the second seatbelt 24, and the latch plate 22 combination may not obstruct the occupant 26 entering or exiting the vehicle 12. When the head restraint 46 is in the lowered position and the latch plate 22 is in the buckled position, the first seatbelt 16 may be in a more comfortable position for the occupant 26 as the first seatbelt 16 extends across the shoulder 28 of the occupant 26.

With reference to FIGS. 1-3, the second seatbelt 24 may include a button 88 fixed to webbing of the second seatbelt 24. The button 88 is fixed to the webbing between the latch plate 22 and the anchor 80. The button 88 is dimensioned to prevent the latch plate 22 from sliding past the button 88. When the latch plate 22 is pulled by the occupant 26, the latch plate 22 pushes the button 88 to retract the second seatbelt 24 from the second retractor 74. The button 88 also prevents the latch plate 22 from sliding downwardly toward the anchor 80 when the latch plate 22 is in the unbuckled position. This positions the first seatbelt 16 such that the occupant 26 may easily pull the first seatbelt 16 over the head 48 of the occupant 26.

Figure 7:
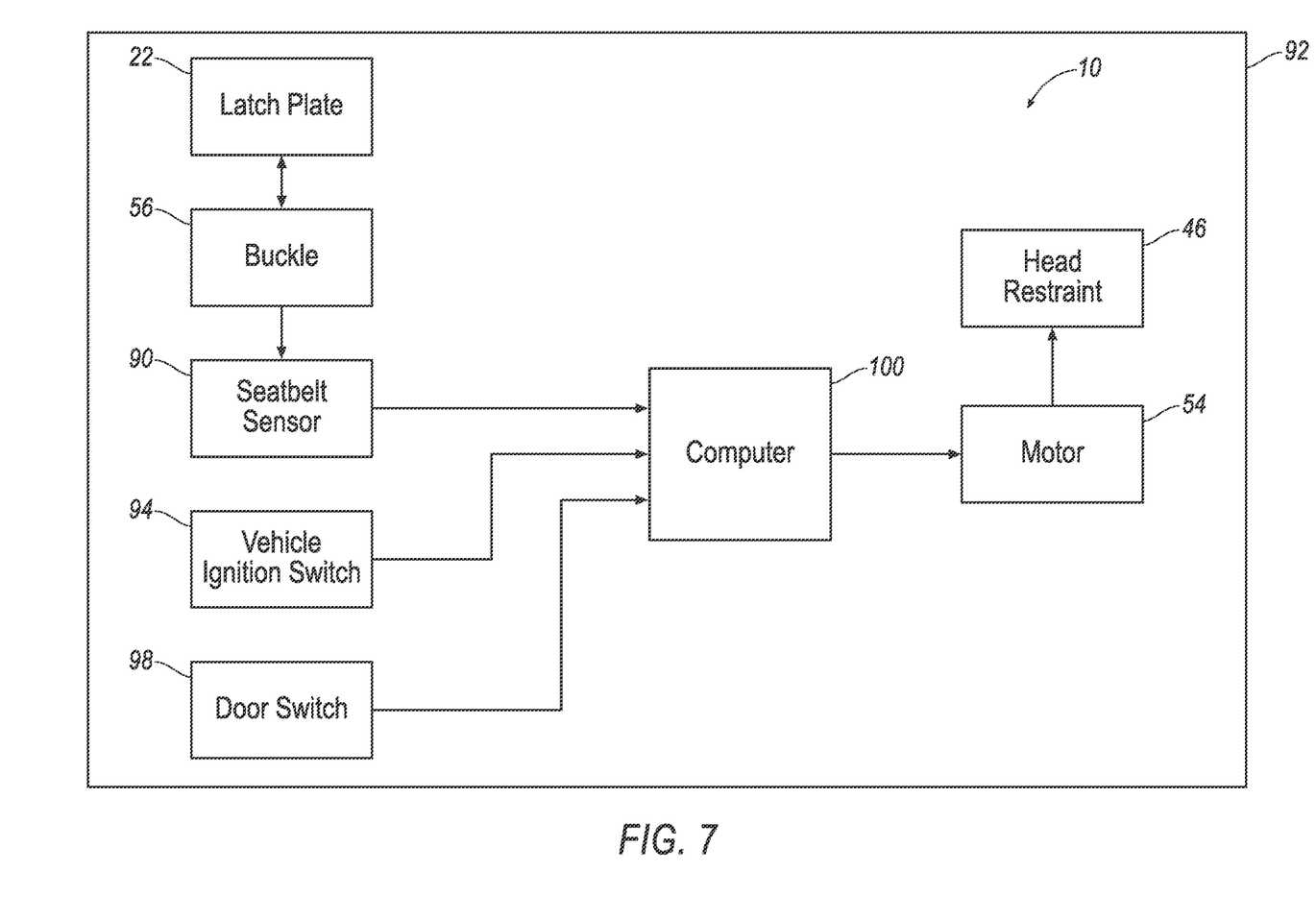
FIG. 7 is a block diagram of a vehicle system including the seat assembly.

As shown in FIGS. 2-3, and 7, the seat assembly 10 may include a seatbelt sensor 90. The seatbelt sensor 90 may be mounted to the buckle 56, e.g., inside the buckle 56 and positioned to be proximate to the latch plate 22 when the latch plate 22 engages the buckle 56, as shown in FIGS. 2-3. As set forth below, the seatbelt sensor 90 may provide an electrical signal that indicates to, e.g., a processor, that the latch plate 22 is fully engaged or disengaged with the buckle 56. The seatbelt sensor 90 may be any suitable sensor for detecting the engagement or disengagement of the latch plate 22 with the buckle 56, e.g., Hall Effect sensor, reed switch, mechanical switch, etc.

With reference to FIG. 7, the vehicle 12 may include the vehicle system 92. The seat assembly 10 may be a component of the vehicle system 92. The vehicle system 92 may include the vehicle ignition switch 94, and the vehicle door 96 having a door switch 98. As set forth below, the vehicle system 92 and/or the seat assembly 10 may include the computer 100 programmed to receive, e.g., signals from the seatbelt sensor 90, the vehicle ignition switch 94, and the door switch 98, and as a result of receiving the signals, command the motor 54 to move the head restraint 46 to the raised position, or the lowered position.

As shown in FIG. 1, the vehicle ignition switch 94 may be mounted in a passenger compartment 102 of the vehicle 12, e.g., on an instrument panel 104, on a column (not shown) of a steering wheel 106, etc. The occupant 26 may energize or de-energize the vehicle ignition switch 94, which activates or de-activates, respectively, a main electrical system of the vehicle 12. The vehicle ignition switch 94 may include an ignition voltage sensor (not shown) that provides an electrical signal that indicates to, e.g., a processor, that the vehicle ignition switch 94 is energized or de-energized.

With continued reference to FIG. 1, the door switch 98 of the vehicle door 96 may be mounted in, e.g., a door jamb, of the vehicle door 96. The door switch 98 is activated when the vehicle door 96 is opened. The door switch 98 may include a door switch sensor (not shown) that provides an electrical signal that indicates to, e.g., a processor, that the vehicle door 96 has opened. Each vehicle door 96 of the vehicle 12, e.g., a driver door, a passenger door, rear doors, etc., may include the door switch 98 and the corresponding door switch sensor. For example, the vehicle 12 shown in FIG. 1 has four vehicle doors 96 and four door switches 98.

The computer 100 may be a microprocessor-based computer implemented via circuits, chips, or other electronic components. For example, the computer 100 may include a processor, memory, etc. The memory of the computer 100 may include memory for storing instructions executable by the processor as well as for electronically storing data. The computer 100 may include and/or be communicatively coupled to more than one computing device, e.g., controllers or the like included in the vehicle 12 for monitoring and/or controlling various components of the vehicle 12.

The computer 100 is configured for, i.e., includes hardware and/or software, communications on a vehicle network such as a controller area network (CAN) bus, local interconnect network (LIN) bus or the like. Via the CAN bus, LIN bus, and/or other wired or wireless mechanisms, the computer 100 may transmit messages to various devices of the vehicle 12 and/or receive messages from the various devices, e.g., controllers, actuators, sensors, etc. Alternatively or additionally, in cases where the computer 100 incorporates multiple devices (not shown), the CAN bus or the like may be used for communications between devices represented as the computer 100 in this disclosure. In addition, the computer 100 may be configured for communicating with other devices via various wired and/or wireless networking technologies, e.g., cellular, BLUETOOTH®, a universal serial bus (USB), wired and/or wireless packet networks, etc.

The computer 100 may be programmed to receive the unlatched signal from the seatbelt sensor 90 indicating that the latch plate 22 is disengaged with the buckle 56, and as a result of receiving the unlatched signal, the computer 100 may command the motor 54 to move the head restraint 46 away from the seat back 38, e.g., to the raised position. The computer 100 may be programmed to receive the latched signal from the seatbelt sensor 90 indicating that the latch plate 22 is engaged with the buckle 56, and as a result of receiving the latched signal, the computer 100 may command the motor 54 to move the head restraint 46 toward the seat back 38, e.g., to the lowered position. The seatbelt sensor 90 may communicate with the computer 100 via the CAN bus, wirelessly, or the seatbelt sensor 90 may be wired directly to the computer 100. The computer 100 may be programmed to receive one or more unlatched and/or latched signals, and command the one or more motors 54 to move the one or more head restraints 46 as a result of receiving the unlatched and/or latched signals.

The computer 100 may be programmed to receive the OFF signal from the ignition voltage sensor of the vehicle ignition switch 94 indicating that the vehicle ignition switch 94 is de-energized, and as a result of receiving the OFF signal, the computer 100 may command the motor 54 to move the head restraint 46 away from the seat back 38, e.g., to the raised position. The computer 100 may be programmed to receive the ON signal from the ignition voltage sensor indicating that the vehicle ignition switch 94 is energized, and as a result of receiving the ON signal, the computer 100 may command the motor 54 to move the head restraint 46 toward the seat back 38, e.g., to the lowered position. The ignition voltage sensor may communicate with the computer 100 via the CAN bus, wirelessly, or the ignition voltage sensor may be wired directly to the computer 100. The computer 100 may be programmed to command the one or more motors 54 to move the one or more head restraints 46 as a result of receiving the OFF and/or ON signals.

The computer 100 may be programmed to receive the open signal from the door switch sensor indicating the vehicle door 96 has opened, and as a result of receiving the open signal, the computer 100 may command the motor 54 to move the head restraint 46 away from the seat back 38, e.g., to the raised position. The door switch sensors may communicate with the computer 100 via the CAN bus, wirelessly, or the door switch sensors may be wired directly to the computer 100. The computer 100 may be programmed to receive one or more open signals, and command the one or more motors 54 to move the one or more head restraints 46 as a result of receiving the open signals.

The computer 100 may include electrical circuitry to interface to the various components of the seat assembly 10 and/or the vehicle system 92. For example, the computer 100 may include electrical circuitry to interface to the seatbelt sensor 90, the ignition voltage sensor, the door switch sensor, and the motor 54.

With reference to FIG. 7, and as set forth above, the seat assembly 10 may include the computer 100, e.g., a seat control module, and the computer 100 may receive, e.g., electrical signals from the seatbelt sensor 90, the ignition voltage sensor, and the door switch sensor, and may command the motor 54. As another example, the vehicle system 92 may include the computer 100, e.g., a body control module (BCM) and/or a restraint control module (RCM), and the computer 100 may receive, e.g., electrical signals from the seatbelt sensor 90, the ignition voltage sensor, and the door switch sensor, and may command the motor 54. As another example, and as described above, the computer 100 may incorporate multiple devices. In this case, for example, one device, e.g., the BCM, may receive the electrical signals from the ignition voltage sensor and the door switch sensor, and communicate a status of the vehicle ignition switch 94 and the door switch 98 over the CAN bus. In keeping with this multiple device example, another device, e.g., the seat control module, may receive the electrical signal from the seatbelt sensor 90, and the status of the vehicle ignition switch 94 and the door switch 98 from the CAN bus, and may command the motor 54.

Figure 8:
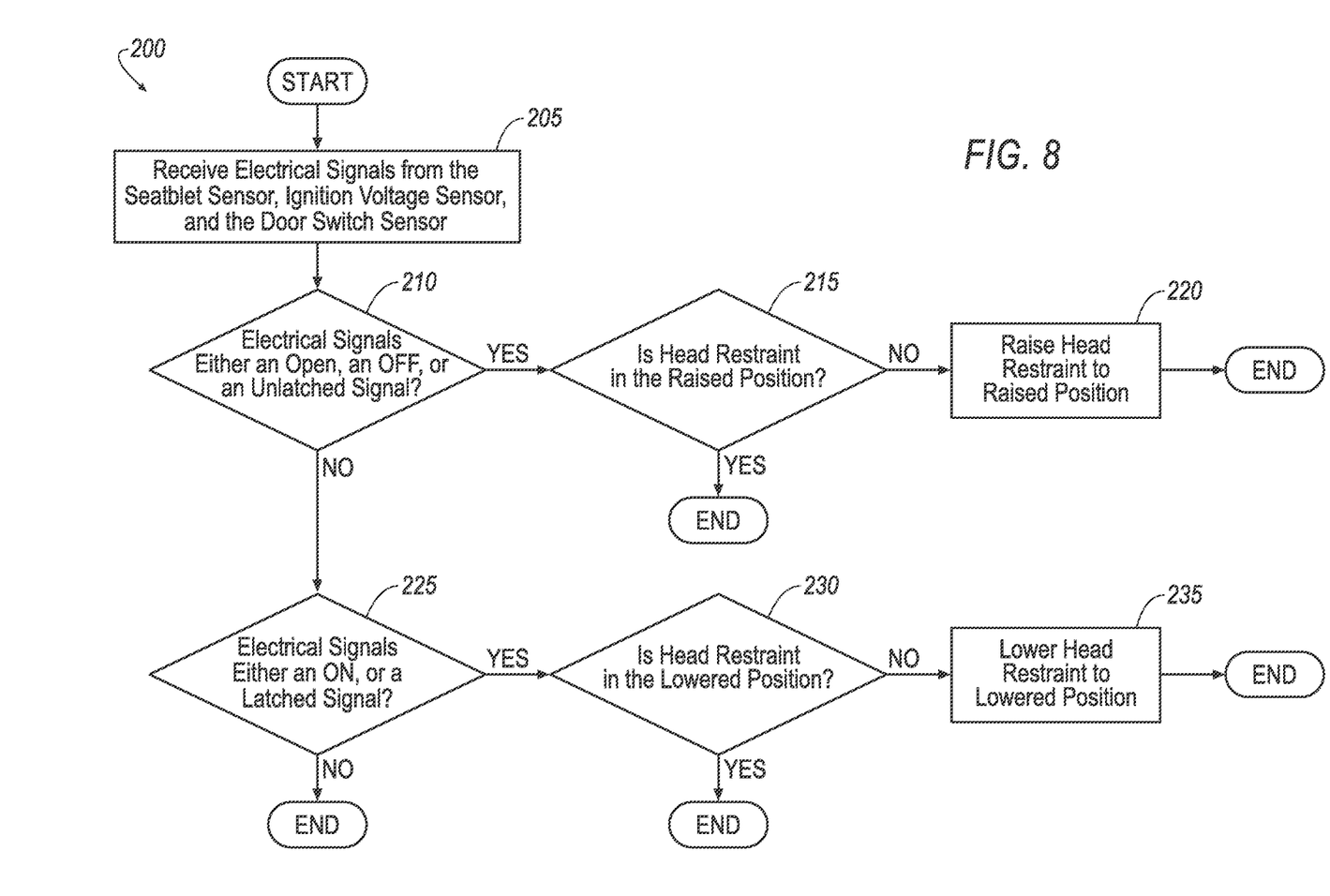
FIG. 8 is a flowchart of an example process of the vehicle system including the seat assembly for raising and lowering the head restraint.

FIG. 8 is a flowchart of an example process 200 that may be executed by the computer 100 when the occupant 26 engages with the vehicle system 92 and/or the seat assembly 10. The process 200 may execute at any time, such as when the occupant 26 opens the vehicle door 96, engages with the vehicle ignition switch 94, or engages/disengages the latch plate 22 with the buckle 56. The process 200 starts at a block 205.

In the block 205, the computer 100 receives the electrical signals from the seatbelt sensor 90, the ignition voltage sensor, and the door switch sensor. The electrical signals received by the computer 100 may, for example, be stored in the memory of the computer 100.

Next, in a decision block 210, the computer 100 determines whether the received electrical signals are either the open signal from the door switch sensor indicating the vehicle door 96 has opened, the OFF signal from the ignition voltage sensor indicating that the vehicle ignition switch 94 is de-energized, or the unlatched signal from the seatbelt sensor 90 indicating that the latch plate 22 is disengaged with the buckle 56. If any of these three electrical signals have been received by the computer 100, the process 200 proceeds to a decision block 215. Otherwise, the process 200 proceeds to a decision block 225.

In the decision block 215, the computer 100 determines whether the head restraint 46 is in the raised position. If the head restraint 46 is already in the raised position, the motor 54 of the seat assembly 10 need not be activated, and the process 200 ends. Otherwise, the process 200 proceeds to a block 220.

In the block 220, the computer 100 commands the motor 54 of the seat assembly 10 to raise the head restraint 46 away from the seat back 38 to the raised position. After the head restraint 46 is in the raised position, the process 200 ends.

In the decision block 225, the computer 100 determines whether the received electrical signals are either the ON signal from the ignition voltage sensor indicating that the vehicle ignition switch 94 is energized, or the latched signal from the seatbelt sensor 90 indicating that the latch plate 22 is engaged with the buckle 56. If any of these two electrical signals have been received by the computer 100, the process 200 proceeds to a decision block 230. Otherwise the process 200 ends, i.e., the electrical signals received by the computer 100 did not indicate that the vehicle door 96 was opened, the vehicle ignition switch 94 was energized/de-energized, or that the latch plate 22 was engaged/disengaged with the buckle 56.

In the decision block 230, the computer 100 determines whether the head restraint 46 is in the lowered position. If the head restraint 46 is already in the lowered position, the motor 54 of the seat assembly 10 need not be activated, and the process 200 ends. Otherwise, the process 200 proceeds to a block 235.

In the block 235, the computer 100 commands the motor 54 of the seat assembly 10 to lower the head restraint 46 toward the seat back 38 to the lowered position. After the head restraint 46 is in the lowered position, the process 200 ends.

Processors such as those discussed herein each include instructions executable by one or more processing devices such as those identified above, and for carrying out blocks or steps of processes described above. For example, process blocks discussed above may be embodied as computer-executable instructions.

The computer 100 and/or devices described may employ any of a number of computer operating systems, including, but by no means limited to, versions and/or varieties of the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, or handheld computer, or some other computing system and/or device.

The computer 100 includes computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by the computer 100 (e.g., by a processor of the computer 100). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which the computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat assembly comprising:
    a seat;
    a first seatbelt having a first end and a second end, the first end being coupled to the seat;
    a latch plate fixed to the second end of the first seatbelt;
    a second seatbelt slideably coupled to the latch plate; and
    a buckle fixed to the seat and being releasably engageable with the latch plate in a buckled position;
    in the buckled position, the first seatbelt being positioned to extend from the latch plate across one shoulder of an occupant and the second seatbelt being positioned to extend from the latch plate across the other shoulder of the occupant; and
    the seat includes a seat back and a head restraint supported by the seat back, the head restraint defining a guide passage, and the first seatbelt extending through the guide passage;
    wherein the head restrain has a perimeter and defines a slit, the slit extending from the perimeter to the guide passage.

2. The seat assembly of claim 1, wherein the latch plate defines a slot, and the second seatbelt extends through and is slidable relative to the slot.

3. The seat assembly of claim 2, wherein the latch plate defines a second slot, and the second end of the first seatbelt is fixed to the second slot.

4. The seat assembly of claim 1, further comprising a retractor mounted to the seat, the first end of the first seatbelt being retractably engaged with the retractor at the first end of the first seatbelt.

5. The seat assembly of claim 4, further comprising a second retractor, the second seatbelt being retractably engaged with the second retractor.

6. The seat assembly of claim 1, further comprising a retractor mounted to the seat back, the first end of the first seatbelt being retractably engaged with the retractor at the first end of the first seatbelt, the first seatbelt extending from the retractor through the guide passage to the latch plate.

7. The seat assembly of claim 1, wherein the head restraint includes a cap extending across the slit.

8. The seat assembly of claim 1, further comprising a motor coupled to the head restraint, and a computer, wherein the computer is programmed to receive an unlatched signal indicating that the latch plate is disengaged with the buckle, and as a result of receiving the unlatched signal, command the motor to move the head restraint away from the seat back.

9. The seat assembly of claim 8, wherein the computer is further programmed to receive a latched signal indicating that the latch plate is engaged with the buckle, and as a result of receiving the latched signal, command the motor to move the head restraint toward the seat back.

10. The seat assembly of claim 5, further comprising an anchor, a first end of the second seatbelt being retractably engaged with the second retractor, and a second end of the second seatbelt being fixed to the anchor.

11. The seat assembly of claim 10, wherein second seatbelt includes a webbing and a button fixed to the webbing between the latch plate and the anchor, the button dimensioned to prevent the latch plate from sliding downwardly toward the anchor when the latch plate is in an unbuckled position.

* * * * *